United States Patent [19]

Hirata et al.

[11] Patent Number: 4,800,759

[45] Date of Patent: Jan. 31, 1989

[54] SEMICONDUCTOR PRESSURE CONVERTER

[75] Inventors: Terutaka Hirata; Tetsu Odohira; Tadashi Nishikawa, all of Tokyo, Japan

[73] Assignee: Yokogawa Electric Corporation, Tokyo, Japan

[21] Appl. No.: 91,219

[22] Filed: Aug. 31, 1987

[51] Int. Cl.[4] ............... G01L 7/08; G01L 9/06; G01L 19/04

[52] U.S. Cl. .................................. 73/708; 73/721; 73/727

[58] Field of Search ............... 73/4 R, 708, 720, 721, 73/726, 727, 754; 324/DIG. 1; 323/365

[56] References Cited

U.S. PATENT DOCUMENTS

| | | | |
|---|---|---|---|
| 3,646,815 | 3/1972 | Martin et al. | 73/727 |
| 4,233,848 | 11/1980 | Sato et al. | 73/727 |
| 4,362,060 | 12/1982 | Okayama et al. | 73/727 |
| 4,480,478 | 11/1984 | Sato et al. | 73/708 |
| 4,732,044 | 3/1988 | Dell' Acqua et al. | 73/727 |

Primary Examiner—Donald O. Woodiel
Attorney, Agent, or Firm—Moonray Kojima

[57] ABSTRACT

A semiconductor pressure converter wherein a drive voltage is applied to a power supply end of a shearing type gage formed at the strain generating part of a semiconductor diaphragm, and an output voltage appearing at the output end thereof is amplified with an amplifier. The zero point is adjusted by applying a bias voltage to the amplifier which is related to the drive voltage. The span is adjusted without interference to the zero point by changing the feedback voltage of the amplifier. Linear compensation, temperature zero point compensation and temperature span compensation are attained without any mutual interference.

18 Claims, 7 Drawing Sheets

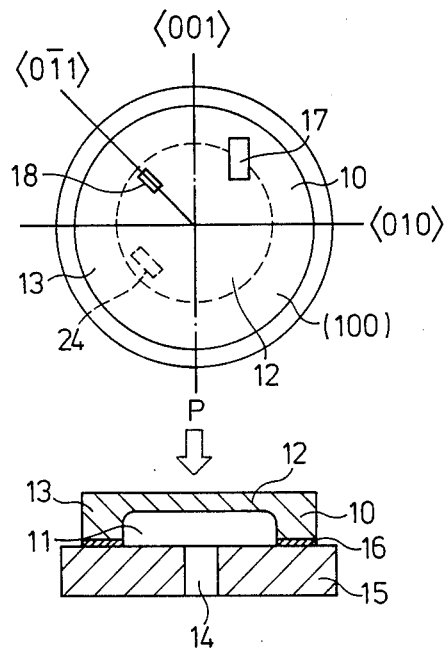
FIG. 1 (a)
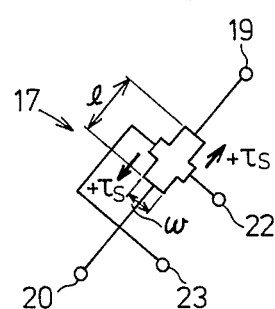
FIG. 1 (b)
FIG. 1 (c)

SEMICONDUCTOR PRESSURE CONVERTER

BACKGROUND OF THE INVENTION

1. Field of the Invention

This invention relates to a semiconductor pressure converter which uses a semiconductor, such as silicon, as a diaphragm for pressure detection and converts pressure into electrical signal by utilizing the semiconductor piezo-resistance effect; and, more particularly, to an improvement in the semiconductor pressure converter which is capable of adjusting various characteristics of the semiconductor pressure converter utilizing a shearing type gage without mutual interferences.

2. Discussion of the Prior Art

An existing circuit for obtaining an output voltage in response to pressure applied to semiconductor pressure detector comprises an ordinary type gage formed on the surface of a semiconductor diaphragm, wherein resistance value changes corresponding to applied pressure. The strain gage is formed in a bridge structure. A constant voltage is applied to a power supply end of the strain gage and an output voltage is obtained from an output end corresponding to the applied pressure.

Since the ordinary type gage is formed by a semiconductor material, the zero point changes depending on slight differences of temperature of each ordinary type gage forming the bridge circuit.

It is known to connect resistance material having a resistance temperature coefficient which is different from the resistance temperature coefficient of the ordinary type gage in series or parallel to the ordinary type gage to compensate for temperature point shift.

Some ordinary type gages do not change in a linear manner the resistance change for increase of applied pressure and tend to show reduction of sensitivity of resistance change in accordance with increase of pressured applied. In this case, an output signal of a bridge circuit for applied pressure is detected by a first amplifier and is then fed back in positive to a second amplifier which supplies a voltage to the power supply end of the bridge circuit. In this manner, a voltage applied to the bridge is boosted with increase of applied pressure and reduction of sensitivity can be prevented. Moreover, relation of output voltage to applied pressure is linearized.

However, the circuit which compensates for temperature zero point shift, as explained previously, further requires a resistance for zero adjustment of unbalance of the bridge circuit which is generated when the resistance material for compensation is connected in series or parallel to the ordinary type gage. These resistances generate temperature variations if these are not equivalent to the temperature coefficient of the gages. In addition, since the temperature coefficients of different gages are different, it is difficult to adjust the temperature coefficient. Moreover, series and parallel connections of resistances to gages result in the disadvantage that span is influenced and adjustment is complicated.

Moreover, the existing linear compensation circuit, wherein an output voltage of the first amplifier is additionally applied to the second amplifier for addition to the power supply of the bridge circuit still has the following deficiencies. If the first amplifier contains an offset voltage, for example, the voltage including this value is fed back and the characteristic of the second amplifier effects direct influence on the amount of compensation for linearization. For example, the amount of feedback itself changes when the degree of amplification of the first amplifier changes. Adjustment of linearity requires complicated procedures in case the amplifier is given zero adjustment, span adjustment and temperature compensation function, which are usually required. As described above, if the respective adjustments are improperly done, repeated adjustments may be required by changing many times the ambient temperature during temperature compensation. Accordingly, adjustments become expensive.

Thus, the prior art arrangements still leave something to be desired.

SUMMARY OF THE INVENTION

Accordingly, an object of the invention is to overcome the aforementioned and other deficiencies and disadvantages of the prior art.

Another object is to provide a semiconductor pressure converter which realizes high precision and high stability temperature compensation, does not generate mutual interference even in setting of zero span adjustment and is capable of executing linear compensation with a simplified arrangement.

The foregoing and other objects are attained by the invention which encompasses a shearing type gage which is formed at the strain generating part of a semiconductor diaphragm and which outputs a voltage in accordance with the shearing stress generated at the strain generating part according to a measured pressure. The invention further comprises a drive circuit which applies a drive voltage to the power supply end of the shearing type gage, an amplifying means which amplifies an output voltage generated at the output end of the shearing type gage, a zero adjusting means which adjusts deviation of zero point by zero point shift of the shearing type gage by adding a bias voltage in relation to the drive voltage of the drive circuit to such amplifying means, a span adjusting means which adjusts span by changing a feedback voltage of the amplifying means and functions which can adjust various characteristics.

BRIEF DESCRIPTION OF THE DRAWINGS

FIGS. 1(a), 1(b) and 1(c) are diagrams depicting an illustrative embodiment of the invention.

DETAILED DESCRIPTION OF THE INVENTION

Figure 2:
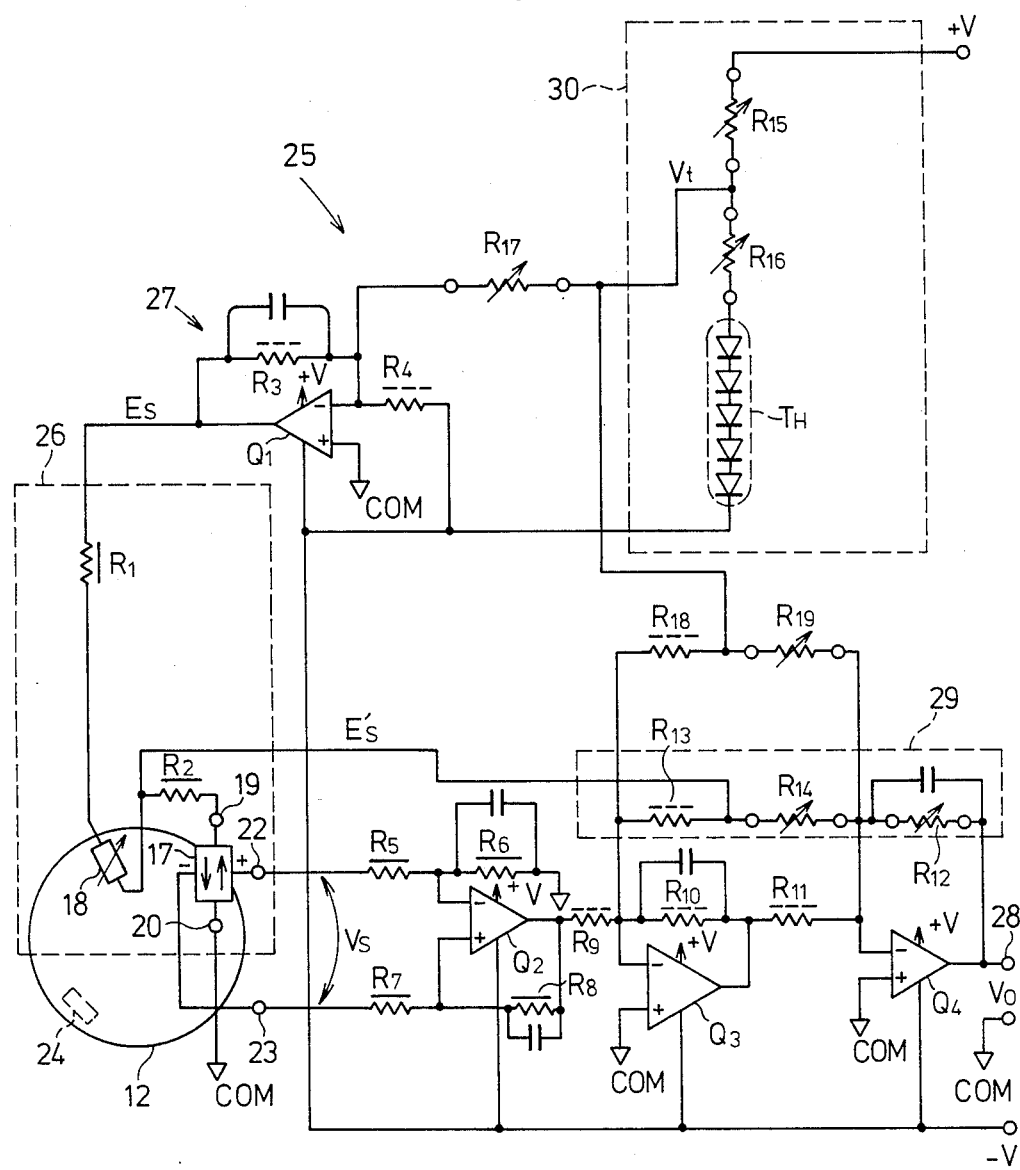
FIG. 2 is a circuit diagram depicting the converting part, including the sensor of FIG. 1.

Turning now to FIGS. 1(a), 1(b) and 1(c), a diaphragm 10 is formed by an n-type silicon single crystal which includes a recessed part 11. A strain generating part 12 is formed by a thin single crystal due to the formation of recessed part 11 and peripheral fixing part 13 and is fixed to a substrate 15 by an anode junction through a glass thin film 16. Strain generating part 12 is formed as a plane (100) and shearing gage 17 is formed thereon by diffusion of a p-type impurity in the vicinity of the boundary of strain generating part 12 and fixing part 13 in the direction of crystal axis <001> passing the center of plane (100). Moreover, an ordinary type gage 18, which changes resistance when a pressure P is applied, is also formed by diffusion of a p-type impurity in the strain generating part in the axial direction <011> which forms an angle of 45° to the axis <001>.

In FIG. 1(c), which is an enlarged view of the shearing type gage 17, gage 17 has length l and width W. The power supply ends 19,20 are formed in the longitudinal direction of the shearing gage and a voltage is applied to power supply ends 19,20 from a source not shown. When a pressure P is applied to diaphragm 10, a voltage corresponding to a shearing stress $\tau_s$ can be obtained at the output ends 22,23 formed substantially at the center of gage length l. However, the resistance of power supply ends 19,20 does not change due to the applied pressure P.

The ordinary type gage 24 formed in the direction along the circumference in the periphery of strain generating part 12 (see FIG. 1(a)) reduces its resistance value against increase of applied pressure P, contrary to the ordinary type gage 18, and is used for linear compensation in the forward, that is positive, direction.

FIG. 2 depicts a converting part 25 which converts pressure into a voltage using the pressure sensor of FIG. 1. In this diagram, the resistor $R_1$, ordinary type gage 18, resistor $R_2$, shearing type gage 17, are serially connected in this sequence between the output end of amplifier $Q_1$ and common potential point COM. These resistors and gages form a linear compensating circuit 26. Resistor $R_3$ is connected between the output end of amplifier $Q_1$ and the inverting input end (−) of amplifier $Q_1$. A negative voltage −V is also applied to inverting input end (−) of amplifier $Q_1$ through resistor $R_4$. The non-inverting input end (+) of amplifier $Q_1$ is connected to common potential point COM. These component comprise drive circuit 27. A drive voltage $E_s$ is obtained at the output end of amplifier $Q_1$.

The output ends 22,23 of the shearing type gage 17 are connected to the input end of amplifier $Q_2$ which forms a differential amplifier, giving an output voltage $V_s$ to differential amplifier $Q_2$. The inverting input end (−) of amplifier $Q_2$ is connected to the voltage dividing point of resistors $R_5$, $R_6$ connected in series between the output end 22 and common potential point COM. The non-inverting input end (+) of amplifier $Q_2$ is connected to the output end 23 through resistor $R_7$ and is also connected to the output end of amplifier $Q_2$ through resistor $R_8$. The inverting input end (−) of amplifier $Q_3$ is connected to the output end of amplifier $Q_2$ through resistor $R_9$ and is also connected to the output end of amplifier $Q_3$ through resistor $R_{10}$. Non-inverting input end (+) of amplifier $Q_3$ is connected to common potential COM. Moroever, inverting input end (−) of amplifier $Q_4$ is connected to the output end of amplifier $Q_3$ through resistor $R_{11}$ and is also connected to the output end 28 of amplifier $Q_4$ through variable resistor $R_{12}$. The span can be changed by changing the resistance value of variable resistor $R_{12}$.

Each inverting input end (−) of amplifiers $Q_3$, $Q_4$ is connected with the series circuit of resistor $R_{13}$ and variable resistor $R_{14}$ and the connecting point of resistor $R_{13}$ and variable resistor $R_{14}$ is connected to the connecting point of ordinary type gage 18 and resistor $R_2$ and a drive voltage $E'_s$ is applied thereto. The zero point can be adjusted by adjusting variable resistance $R_{14}$. Resistor $R_{13}$, variable resistor $R_{14}$ and variable resistor $R_{12}$ comprise a zero span setting circuit 29.

A temperature signal generating circuit 30 is provided comprising temperature sensor $T_H$, variable resistors $R_{12}$, $R_{16}$ connected in series between the power supply designated positive voltage +V and negative voltage −V. A diode, not shown, can also be connected in the series circuit. A temperature signal can be obtained between the connecting point of the variable resistors $R_{15}$ and $R_{16}$ and common potential COM.

A variable resistor $R_{17}$, for adjusting temperature span, is connected between the connecting point of variable resistors $R_{15}$, and $R_{16}$ and the inverting input end (−) of amplifier $Q_1$. In addition, resistor $R_{18}$ and variable resistor $R_{19}$ are connected in series between respective inverting input ends (−) of amplifiers $Q_3$ and $Q_4$ and the connecting point of resistor $R_{18}$ and variable resistor $R_{19}$ is connected to the connecting point of variable resistors $R_{15}$ and $R_{16}$. Variable resistor $R_{19}$ is used for adjusting temperature zero point. The respective power supply ends of amplifiers $Q_1$–$Q_4$ receive the positive and negative voltages +V,−V. Each element is respectively integrated on a silicon single crystal such as the fixing part 13 of diaphragm 10 formed by the integrated circuit technique.

The capacitors respectively connected in parallel to resistors $R_3$, $R_6$, $R_8$, and $R_{10}$ and variable resistor $R_{12}$ are provided for noise elimination. For example, it is formed by using silicon dioxide insulation film covering the single crystal of the fixing part 13 of diaphragm 10.

The converting part depicted in FIG. 2 may be formed with one chip on diaphragm 10 or may be formed by two chips separate from the sensor part. Moreover, the converting part may also be formed as a hybrid integrated circuit. Also, the diaphragm 10, while shown to be circular in FIG. 1, may be of other shapes, such as a square shape.

The circuit operates as follows. Zero point adjustment, linear compensation and span adjustment at a reference temperature $t_o$, and then temperature zero point adjustment and temperature span adjustment at another temperature are accomplished as follows.

ZERO POINT ADJUSTMENT

First, temperature signal $V_t$ is adjusted to zero by adjusting variable resistors $R_{15}$ and $R_{16}$ at reference temperature $t_o$.

Next, pressure P is applied to diaphragm 10 and set to zero condition $P_o$. Under this condition, since offset voltage $E_{off}$ is generally generated at output ends 22,23 of shearing type gage 17, the zero point adjustment is carried out so that an output becomes 0% by flowing a current to cancel the current produced by the offset voltage $E_{off}$ to the adding point of amplifier $Q_4$ through adjustment of variable resistor $R_{14}$ to one end of which the drive voltage $E'_s$ is applied.

LINEAR COMPENSATION

Thereafter, a pressure P is applied to diaphragm 10 for linear compensation and the relation between pressure P and corresponding output voltage $V_s$ is obtained by changing pressure P.

The shearing type gage 17 does not change linearly its output voltage $V_s$ but non-linearly for increase of applied pressure P. The output sometimes increases or decreases more than that in the case of linear change for the increase of applied pressure P. Ordinary type gage 18 tends to increase its resistance value for increase of pressure P, while ordinary type gage 24 shows an inverse trend. Thus, ordinary type gage 18 or 24 is selectively used in accordance with the pressure characteristic of gage 17. In this case, gage 18 is selected under the supposition that gage 17 has the characteristic in such a trend that output voltage $V_s$ increases more than that in the linear change for increase of pressure P.

As will be explained later, the resistance of gage 18 can be changed. Thus, the linear compensation of gage 17 can be realized by adjusting the resistance value. Namely, an output voltage $V_s$ of gage 17 tends to increase more than that in linear change of output for increase of pressure P. In this case, since the resistance value of gage 18 also increase simultaneously, voltage applied to power supply ends 19 and 20 of gage 17 and output voltage $V_s$ of gage 17 suppresses the trend of increase and can be linearized. Resistor $R_2$ is used for priorly adjusting the series resistance of resistor $R_2$ and the resistance between the power supply ends 19 and 20 of gage 17 to a constant value in spite of fluctuation of gage 17 under the condition that the temperature is the reference temperature $t_0$ and applied pressure P is zero.

The drive voltage $E'_s$ is changed by changing the resistance value of gage 18, but this change does not influence the zero point because it gives effect at the same rate to the current flowing into the adding point of amplifier $Q_4$ and zero adjusting current flowing thrugh variable resistor $R_{14}$ and resistor $R_{13}$ due to the offset voltage $E_{off}$ of gage 17.

Figure 3:
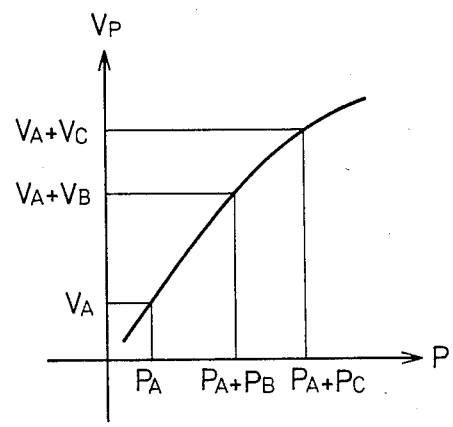
FIG. 3 is a graph depicting the relationship between output voltage and pressure applied to the shearing type gage.

Linear compensation is explained in further connection with FIG. 3. If the characteristic curve of FIG. 3, which is the pressure and output voltage of gage 17 before compensation, is expressed as a parabola passing three points $(P_A, V_A)$, $(P_A+P_B, V_A+V_B)$, $(P_A+P_C, V_A+V_C)$, the output voltage $V_s$ can be expressed as follows.

$$V_s = [(P-P_A)\$_1/(P_C P_B)] + V_A \quad (1)$$

wherein
$\$_1 = [(V_B P_C/P_B) - (V_C P_B/P_C)] - (V_B/P_B - V_C/P_C)(P-P_A)$.

For simplification, when $P_A = V_A = 0$, equation (1) can be transformed as $$V_s = [P\$_2/(P_C - P_B)] \quad (2)$$

wherein
$\$_2 = (V_B P_C/P_B) - (V_C P_B/P_C)] - (V_B/P_B - V_C/P_C)P$.

Equation (1) can also be transformed as $$V_s = P(P_C V_B/P_B - P_B V_C/P_C)/(P_C - P_B)\$_3 \quad (3)$$

wherein
$\$_3 = 1 - [P(V_B/P_B - V_C/P_C)/(P_C V_B/P_B - P_B V_C/P_C)]$.

Here, when a drive current flowing into gage 17 is I, resistivity of unit thickness namely sheet resistance of gage 17 is $R_s$, shearing piezo-resistance coefficient is $\pi_1$ and shearing stress working on gage 17 is $\pi\tau_1$, the following equation can be obtained.

$$V_s = IR_s \tau_1 \pi_1 \quad (4)$$

Here, $\tau_1$ is changed proportional to pressure P, if $\tau_1 = K_o P$ (wherein $K_o$ is a constant)

$$V_s = If(P) \quad (5)$$

wherein
$$f(P) = R_s \pi_1 K_o P \quad (6)$$

Then, refering to FIG. 3, $$V_B = If(P_B) \quad (7)$$

$$V_C = If(P_C) \quad (8)$$

Therefore, equations (7) and (8) are substituted into equation (3)

$$V_s = PI\$_4[(P_C f(P_B)/P_B - P_B f(P_C)/P_C)]/(P_C - P_B) \quad (9)$$

wherein
$\$_4 = 1 - [P(f(P_B)/P_B - f(P_C)/P_C)/(P_C f(P_B)/P_B - P_B f(P-c)/P_C)]$.

In equation (9), if $$I_1 = [(P_C f(P_B)/P_B - P_B f(P_C)/P_C)]/(P_C - P_B) \quad (10)$$

$$K_2 = -[(f(P_B)/P_B - f(P_C)/P_C)/(P_C f(P_B)/P_B - P_B f(P_C)/P_C)] \quad (11)$$
$$= -(V_B/P_B - V_C/P_C)/(P_C V_B/P_B - P_B V_C/P_C)$$

then equation (9) can be transformed as $$V_s = PIK_1(1+K_2P) \quad (12)$$

and output voltage $V_s$ changes in proportion to drive current I as the quadratic equation of pressure P.

Next, when resistance value between power supply ends 19,20 of gage 17 is $R_P$, resistance value of ordinary gage 17 is $R_n(1+K_3P)$ (wherein $K_3$ is rate of change of resistance for the pressure) and resistance value of diffusion resistor $R_2$ is $R_2$ in FIG. 1, a drive current I is expressed as follows if $R_1 = 0$ for simplification.

$$I = E_s/[R_P + R_n(1+K_3P) + R_2] \quad (13)$$
$$= E_s/\$_5$$

wherein
$\$_5 = (R_P + R_n + R_2)[1 + R_n K_3 P/(R_P + R_n + R_2)]$.

When equation (13) is substituted in equation (12)

$$V_s = PE_s K_1(1+K_2P)/\$_5 \quad (14)$$

In equation (14), when resistance value $R_n$ of gage 18 is selected so that $$K_2 = K_3 R_n/(R_P + R_n + R_2) \quad (15)$$

the following equation is obtained $$V_s = K_1 E_s P/(R_P + R_n + R_2) \quad (16)$$

That is to say, the output voltage $V_s$ is proportional to the applied pressure.

SPAN ADJUSTMENT

After linear compensation, span adjustment is carried out by applying the specified pressure $P_1$ to the diaphragm 10. Variable resistor $R_{12}$ is adjusted so that voltage $V_o$ at output end 28 indicates 100% for the specified pressure $P_1$. Thereafter, an output voltage fof amplifier $Q_2$ is zero even when specified pressure $P_1$ is set to zero, giving no influence on the zero point. Moreover, no effect is applied to the linearity adjusting result.

TEMPERATURE ZERO POINT ADJUSTMENT AT CHANGED TEMPERATURE

Next, adjustment of the zero point at a changed or specified temperature is explained. First, temperature is changed to the specified value $t_1$, for example, 80° C., from reference temperature $t_o$, under the condition that the applied pressure P is zero. In this case, an output voltage $V_s$ changes because gage 17 has a temperature coefficient.

On the other hand, temperature voltage $V_t$ also changes to a negative value from zero. Thus, the temperature zero shift amount is compensated so that output becomes 0% at the specified temperature $t_1$ by flowing a current for cancelling a current changed by variation of output voltage $V_s$ resulting from temperature change to the adding point of amplifier $Q_4$ through adjustment of variable resistor $R_{19}$ to one end of which a temperature voltage is applied. Since temperature voltage $V_t$ is zero at the reference voltage even when temperature is lowered to the reference temperature $t_o$ under the condition that the value of variable resistance $R_1$ is changed at the specified temperature, a current is not applied or flows out from the adding point of the amplifier $Q_4$. Therefore, there is no influence of change in resistance value of variable resistor $R_{19}$ at the zero point at the reference temperature.

TEMPERATURE SPAN ADJUSTMENT AT CHANGED TEMPERATURE

Next, pressure P is set to the specified pressure $P_1$ from zero at the specified temperature $t_1$. In this case, since gage 17 has a temperature characteristic, an output voltage is different from that in the reference temperature $t_o$.

Temperature voltage $V_t$ is changed from a negative voltage to zero. The temperature span shift amount is thus compensated so that an output becomes 100% by flowing a compensating current to the adding point of amplifier $Q_1$ through adjustment of variable resistor $R_{17}$ to one end of which temperature voltage $V_t$ is applied and then changing the drive voltage $E_s$ of the output end.

Even when pressure P is set to zero under the condition that drive voltage $E_s$ is changed through temperature compensation of span, the offset voltage of gage 17 and drive voltage $E'_s$ applied to variable resistor $R_{14}$ and resistor $R_{13}$, change at the same rate as the drive voltage $E_s$. Thus, output is kept at 0% producing no interference of the zero point.

As above discussed, the linear compensation, the zero point adjustment, the span adjustment, the temperature zero point adjustment and the temperature span adjustment can be realized without any interference. Moreover, ambient temperature change is required only once to $t_o$ or $t_1$ and it is no longer necessary to know the value of temperature allowing adjustment of temperature compensation. Thus, the converter can be easily adjusted and with high precision.

Figure 4:
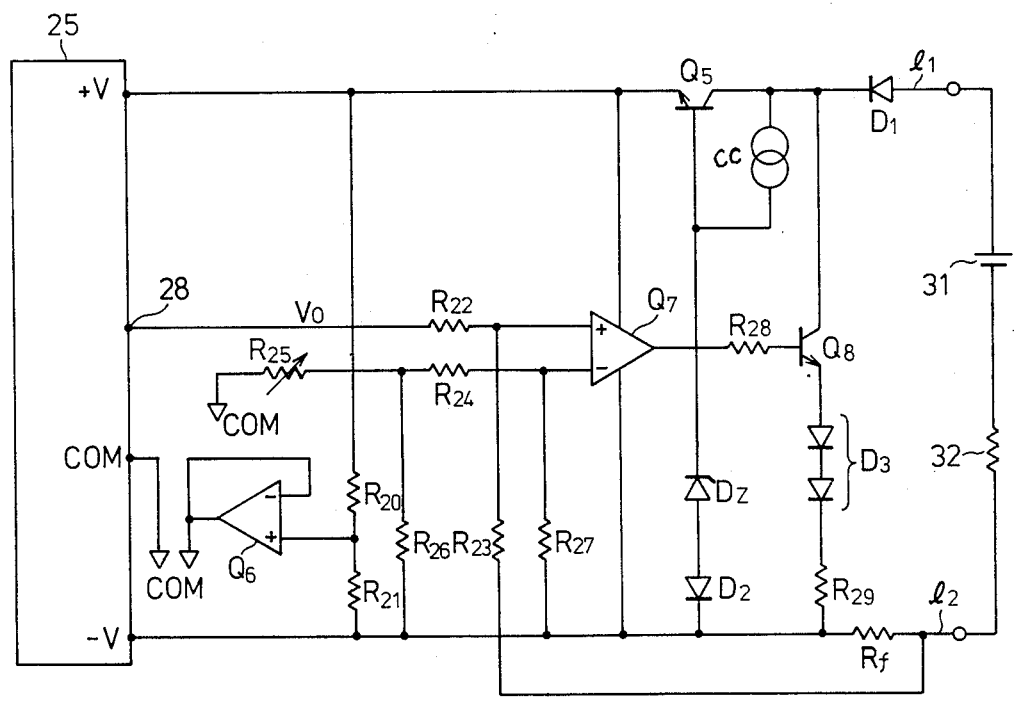
FIG. 4 is a circuit diagram depicting a 2-wire type pressure converter formed using the converting part of FIG. 2.

FIG. 4 is a circuit diagram of a 2-wire system pressure converter formed using converting part 25 indicated in FIG. 2. Power supply 31 is connected to the 2-wire type transmission line $l_1$, $l_2$ through a load 32. The other ends of transmission lines $l_1$, $l_2$ are connected in series with diode $D_1$, current regulating circuit CC, Zener diode $D_z$ and diode $D_2$ for temperature compensation and feedback resistance $R_f$. Moreover, the current regulating circuit CC is connected between the collector and base of transistor $Q_5$ providing a constant voltage between the connecting point of diode $D_2$ and feedback resistance $R_f$ and the emitter of transistor $Q_5$. This constant voltage is divided by resistors $R_{20}$ and $R_{21}$ and the voltage dividing point is connected to non-inverting input (+) of amplifier $Q_6$ formed as the voltage follower connected to common potential COM at its output end, providing positive and negative voltages $+V, -V$ for common potential COM. The positive and negative voltages $+V$ and $-V$ are used as the power supply of converting part 25 and amplifiers $Q_6, Q_7$.

The non-inverting input end (+) of amplifier $Q_7$ is respectively connected to the output end 28 through resistor $R_{22}$ and to one end of feedback resistor $R_f$ through resistor $R_{23}$. Voltages obtained by dividing the voltages of output voltages $V_o$ of output 3nd 28, voltage $-V$ and voltage across the feedback resistor $R_f$ are applied thereto.

The inverting input end (−) of amplifier $Q_7$ is connected to the common potential COM through the series circuit of resistor $R_{24}$ and variable resistor $R_{25}$. Both ends of resistor $R_{24}$ are connected to voltage $-V$ through resistors $R_{26}$ and $R_{27}$. Voltage obtained by dividing voltage $-V$ with resistors $R_{24}$ and $R_{27}$ is applied to the inverting input end (−) of amplifier $Q_7$. The output of amplifier $Q_7$ is applied to the base of output transistor $Q_8$ through resistor $R_{28}$. The collector of output transistor $Q_8$ is connected to the cathode of diode $D_1$ and the emitter of transistor $Q_8$ is connected to the other end of feedback resistor $R_f$ through series circuit of diode group $D_3$ and resistor $R_{29}$.

An output voltage $V_o$ of converting part 25 is converted to a current output by the 2-wire system transmission lines $l_1$ and $l_2$ and is then supplied to the load 32. A current output (4 mA) of the converting part 25 when the output voltage $V_o$ is zero can be adjusted by varying the resistance value of variable resistor $R_{25}$.

Resistors $R_3$, $R_4$, $R_9$, $R_{10}$, $R_{13}$ and $R_{18}$ among various resistors shown in FIG. 2 should be selected to eliminate fluctuations by temperature because the amplification factor for input and output is determined in accordance with the ratio of resistance values. For this purpose, it is recommended to use resistors having the same distribution of impurity concentration as that of the shearing type gage, for example, resistors formed on the semiconductor chips with thin films, or resistors formed on ceramic substrate with thick films.

Moroever, resistors formed of tantalum nitride ($Ta_2N$) having small temperature coefficient may be used. The resistors may be fabricated , for example, by forming respective elements by diffusion on a silicon crystal diaphragm, covering the surface with insulation film, such as silicon oxide ($SiO_2$), and then sputtering tantalum nitride on the surface thereof.

Temperature voltage, zero point, span, temperature zero and temperature span may be adjusted with resistors $R_{16}$, $R_{15}$, $R_{14}$, $R_{12}$, $R_{19}$ and $R_{17}$. These resistors allow use of variable resistors to be provided externally and semi-fixed resistor where aluminum wiring between taps is cut by laser or Zener diodes may be short-circuited among those used in the process of producing monolithic integrated circuits. Moreover, a semi-fixed resistor by laser like a thin film resistor for hybrid integrated circuit may also be used.

Figure 5:
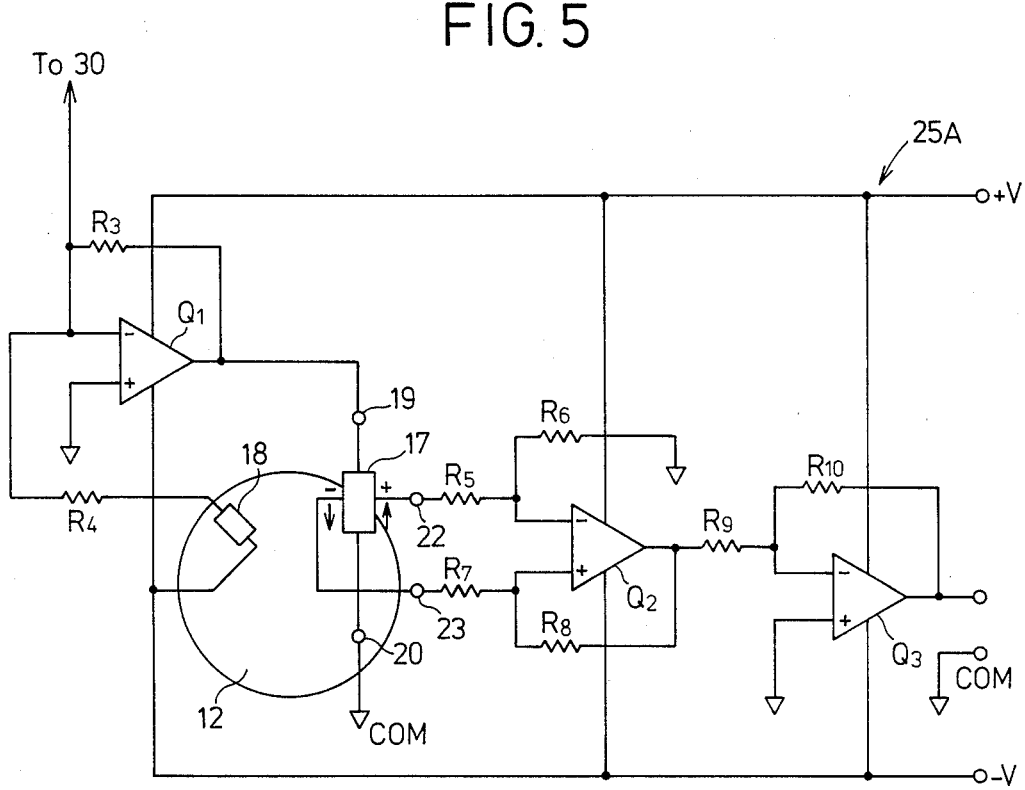
FIG. 5 is a circuit diagram depicting another illustrative embodiment of the invention.

FIG. 5 depicts converting part 25 of FIG. 2 as partly changed. Power supply ends 19 and 20 of gage 17 are connected between the output end of amplifier $Q_1$ and common point COM. Resistor $R_3$ is connected between the inverting input (−) of amplifier $Q_1$ and the output end. Voltage −V is applied to the inverting input end (−) of amplifier $Q_1$ though the series circuit comprising resistor $R_4$ and ordinary type gate 18. A voltage proportional to the ratio of the combined resistance value of resistor $R_4$ and ordinary type gage 18 and the resistance value of resistor $R_3$ is applied to both ends of shearing type gage 17. Since ordinary type gage 18 shows the trend where resistance value increases for increase of applied pressure P, linearization can be made by suppressing the trend where an output voltage of amplifier $Q_1$ is reduced and output voltage $V_s$ of shearing type gage 17 is increased.

In this case, in converting part 25 of FIG. 2, non-linearity of gage 17 is compensated by the rate of resistance change to applied pressure P of the resistance value of gage 18 for the resistance of series circuit comprising gate 18, diffusion resistance $R_2$ and gage 17. On the other hand, in the converting part 25A of FIG. 5, non-linearity of shearing type gage 17 is compensated by the rate of resistance change for applied pressure P of the resistance value of ordinary type gage 18 for the resistance of series circuit comprising resistor $R_4$ and gage 18.

Therefore, the converter of FIG. 5 realizes compensation which is greater than obtained by the converter of FIG. 2.

Figure 6:
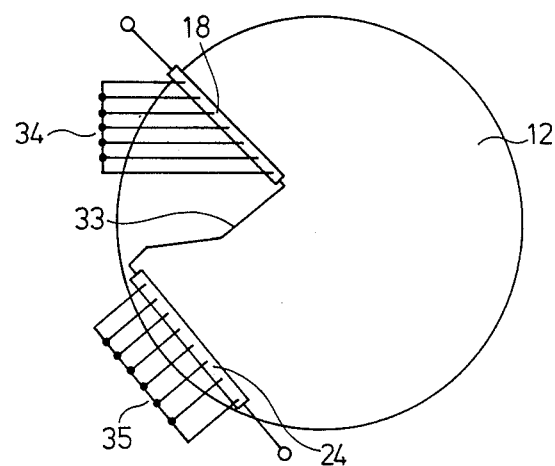
FIG. 6 is a diagram depicting the linear compensation circuit of FIG. 2.

FIG. 6 illustrates apparatus for effecting linear compensation as in FIG. 2, wherein two ordinary type gages 18, 24 are connected to aluminum wiring 33. A plurality of aluminum wirings 34, 35 are guided from each point of the ordinary type gages 18,24. These aluminum wires are previously connected at the other end of the guiding point and the necessary points are cut by laser for adjusting the degree of linearity compensation. Since ordinary type gages 18, and 24, respectively, show changes of resistance in the reverse directions for increases of applied pressure P, these can compensate for non-linearity in both positive and negative directions.

Figure 7:
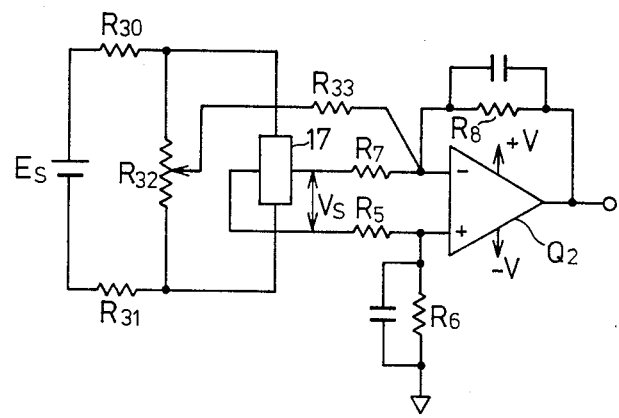
FIG. 7 is a circuit diagram depicting a circuit for eliminating offset voltage.

FIG. 7 is another embodiment which eliminates offset voltage appearing at the output end of gage 17. Drive voltage $E_s$ of amplifier $Q_1$ is divided by resistor $R_{30}$ and $R_{31}$, and variable resistor $R_{32}$. The voltage at both ends of variable resistor $R_{32}$ is applied to the power supply end of gage 17. Moreover, a voltage at the variable intermediate point of variable resistor $R_{32}$ is applied to the inverting input (−) of amplifier $Q_2$ through resistor $R_{33}$. In this case, the combined resistance of resistors $R_{33}$ and $R_8$ is set equal to resistor $R_6$. The offset voltage contained in output voltage $V_s$ can be eliminated by varying the variable intermediate point of variable resistor $R_{32}$.

Figure 8:
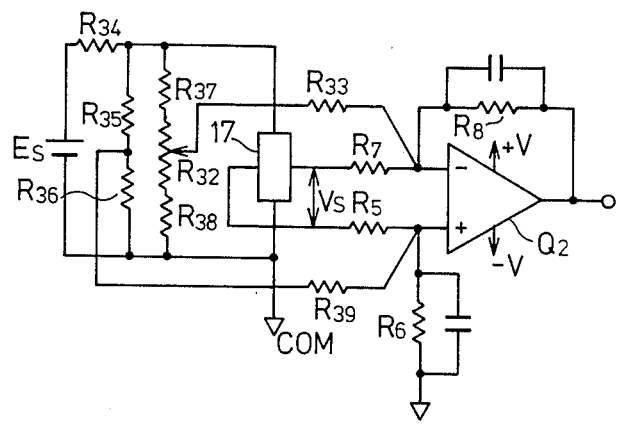
FIG. 8 is a circuit diagram depicting another embodiment for eliminating offset voltage.

FIG. 8 is still another embodiment which eliminates the offset voltage appearing at the output end of gage 17. Drive voltage $E_s$ of amplifier $Q_1$ is applied to the bridge circuit formed by resistors $R_{35}$, and $R_{36}$, and $R_{37}$, and $R_{38}$, and variable resistor $R_{32}$ through resistor $R_{34}$. The variable intermediate point of variable resistor $R_{32}$ is connected to the inverting input end (−) of amplifier $Q_2$ through resistor $R_{33}$. The connecting point of resistors $R_{35}$ and $R_{36}$ is connected to the non-inverting input end (+) of amplifier $Q_2$ through resistor $R_{39}$. The offset voltage contained in output voltage $V_s$ can be eliminated by varying the variable intermediate point of variable resistor $R_{32}$.

Figure 9:
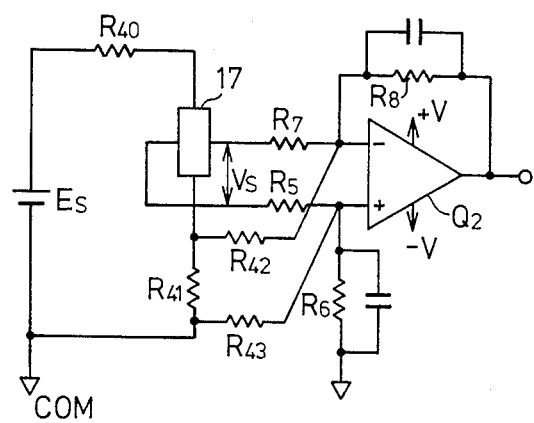
FIG. 9 is a circuit diagram depicting a circuit for generating a voltage to adjust offset voltage from current flowing into the shearing type gage.

FIG. 9 shows an embodiment for generating power supply to adjust offset voltage from current flowing into the gage 17. The power supply for adjusting offset voltage is generated from the current. Drive voltage $E_s$ of amplifier $Q_1$ is applied to the series circuit comprising resistor $R_{40}$, shearing type gage 17 and resistor $R_{41}$. The voltage at both ends of resistor $R_4$ is respectively applied to the inverting input end (−) and non-inverting input end (+) of amplifier $Q_2$ through resistors $R_{42}$ and $R_{43}$. In this case, if the same temperature characteristic is given to resistors $R_s$ and $R_{41}$ between the power supply ends of the gage 17, fluctuation of offset voltage for temperature can be eliminated.

Figure 10:
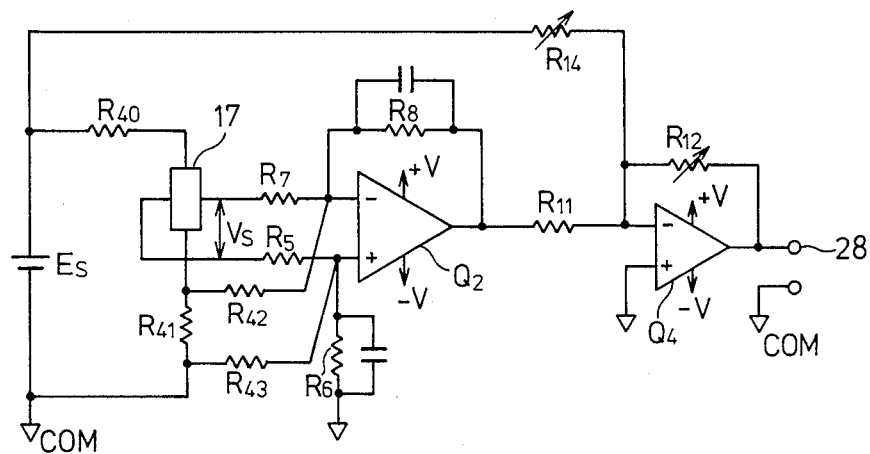
FIG. 10 is a circuit diagram depicting a circuit for positively or negatively adjusting the offset voltage.

FIG. 10 depicts a circuit for positively and negatively adjusting the offset voltage. A voltage, which makes negative the value of output end of amplifier $Q_2$ by resistor $R_{41}$, is applied to the input of amplifier $Q_2$ and drive voltage $E_s$ is applied to the inverting input end (−) of amplifier $Q_4$ through variable resistor $R_{14}$ as the offset voltage adjusting voltage. The offset voltage can be adjusted positively or negatively by adjusting variable resistor $R_{14}$. Therefore, in this case, amplifier $Q_3$ in FIG. 2, can be omitted.

Figure 11:
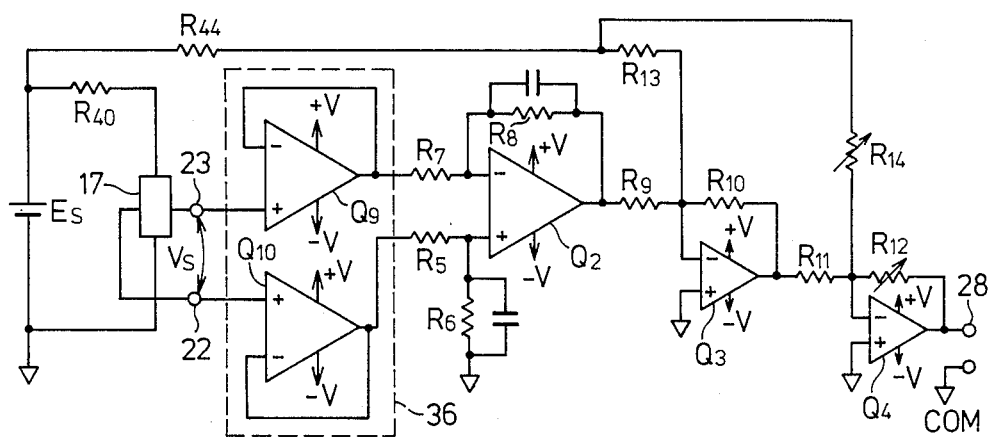
FIG. 11 is a circuit diagram depicting a circuit having a high output impedance of the shearing type gage.

FIG. 11 depicts a circuit wherein output impedance of the shearing type gage is high. When output impedance of gage 17 is high, the output voltage $V_s$ is applied to amplifier $Q_2$ through the impedance converting circuit 36 which has the amplifiers $Q_9$ and $Q_{10}$ operating respectively as voltage follower at the output ends 22 and 23 of gage 17. The offset voltage adjusting voltage is supplied from drive voltage $E_s$ through resistor $R_{44}$.

Figure 12:
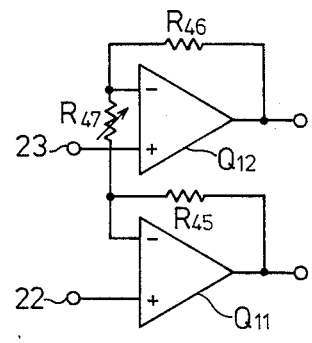
FIG. 12 is a circuit diagram depicting another impedance converting circuit used in FIG. 11.

FIG. 12 is similar to the impedance converting circuit of FIG . 9 but changed as follows. The non-inverting input (+) of amplifiers $Q_{11}$ and $Q_{12}$ are respectively connected to the output ends 22, 23 of gage 17. The inverting input ends (−) are respectively connected to the output end resistors $R_{45}$ and $R_{46}$. Variable resistor $R_{47}$ is connected between inverting input ends (−) of amplifiers $Q_{11}$ and $Q_{12}$ and is used to adjust the amplification.

It is also possible to adjust the offset voltage in one direction by variable resistor $R_{14}$ with resistor $R_{13}$ in FIG. 2 being preset to a predetermined value.

Figure 13A:
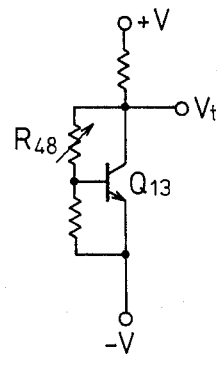
FIGS. 13(a), 13(b), 13(c), 13(d) and 13(e) are circuit diagrams depicting other temperature signal generating circuits used in FIG. 1.
Figure 13B:
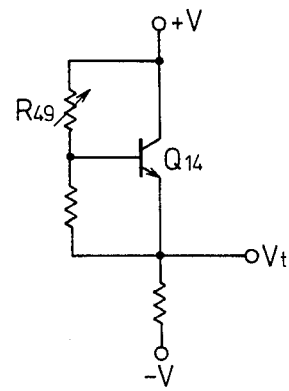
Figure 13C:
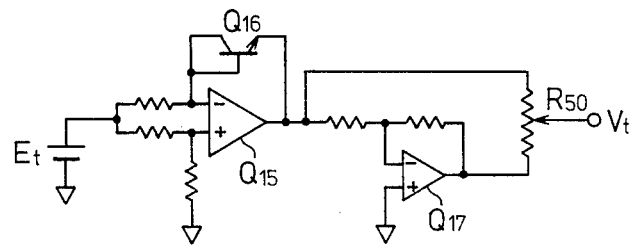

FIG. 13 (a)-FIG. 13 (e) show various temperature signal generating circuits, with FIGS. 13(a)-13(c) utilizing the base-emitter temperature characteristic of a transistor in order to extract temperature voltage $V_t$.

In the circuit of FIG. 13(a), temperature voltage $V_t$ is extracted from the collector by adjusting the variable resistor $R_{48}$ inserted between the base and collector of transistor $Q_{13}$.

The circuit of FIG. 13(b) is an example of extracting temperature voltage $V_t$ from the emitter by adjusting variable resistor $R_{49}$ between the base and collector of transistor $Q_{14}$.

The circuit of FIG. 13(c) utilizes the temperature characteristic between the base and emitter of transistor $Q_{16}$ inserted in the feedback circuit of amplifier $Q_{15}$ to which a constant voltage $E_t$ is applied. The output voltage of amplifier $Q_{15}$ is inputted to amplifier $Q_{17}$ and is amplified therein in order to obtain temperature voltage $V_t$ which can be adjusted positively or negatively from the intermediate point of variable resistor $R_{50}$ which is connected to the output end of amplifiers $Q_{15}$ and $Q_{17}$.

Figure 13D:
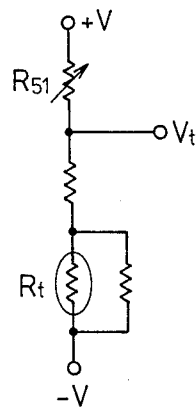

The circuit of FIG. 13(d) obtains temperature voltage $V_t$ from the connecting point of the thermistor $R_t$ and the variable resistor $R_{51}$ connected in series thereto by making use of the temperature characteristic of thermistor $R_t$.

Figure 13E:
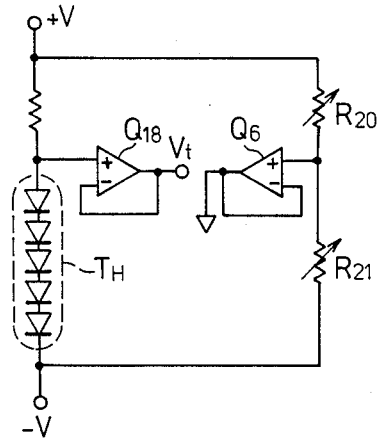

In the circuit of FIG. 13(e), buffer amplifier $Q_{18}$ is added so temperature voltage $V_t$ does not change even when the adjusting resistance is changed. Moreover, the potential of common potential point COM is changed to adjust $V_t=0$ at the reference temperature $t_o$. The circuit, including resistors $R_{20}$ and $R_{21}$ and amplifier $Q_6$ is the same as that shown by the same symbols in FIG. 4 and is eliminated from the temperature signal generating circuit 30.

In this embodiment, the gage of the sensor part is made by forming the diaphragm 10 with n-type silicon single crystal and diffusing p-type impurity in this diaphragm. But, the conductivity type may also be inverted and moreover the gage may be formed, for example, by the ion implantation memthod, in place of the diffusion method.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A semiconductor pressure converter comprising a shearing type gage formed at a strain generating part of a semi-conductor diaphragm, said gage outputting a voltage in accordance with the shearing stress generated at the strain generating part by a measuring pressure applied thereto; a driving circuit for applying a drive voltage to a circuit comprising an ordinary type gage having the same impurity concentration as that of said shearing gage and changing resistance value in response to said applied pressure and said shearing type gage; amplifying means for amplifying output voltage appearing at an output end of said shearing type gage; zero adjusting means for adding a bias voltage related to the drive voltage to said amplifying means and for adjusting displacement of zero point by zero shift of said shearing type gage; and span adjusting means for adjusting the span by changing feedback voltage of said amplifying means so that said zero point and span are adjusted without mutual interference.

2. The converter of claim 1, comprising means for adjusting displacement of zero point due to zero shift of said shearing type gage by applying a divided voltage of said drive voltage to one input end of said amplifying means.

3. The converter of claim 1, comprising means for adjusting displacement of zero point due to zero shift of said shearing type gage by applying a voltage to an input end of said amplifier, said voltage being obtained at an output end of the power supply end of a bridge circuit when said drive voltage is applied thereto.

4. The converter of claim 1, comprising means for adjusting displacement of zero point due to zero shift of said shearing type gage by applying a voltage to an input end of said amplifier, said voltage being obtained at an output end of a fixed resistor when said drive voltage is applied to a series circuit of said shearing type gage and said fixed resistor.

5. The converter of claim 1, comprising means for adjusting displacement of zero point due to zero shift of said shearing type gage by applying said drive voltage to a series circuit comprising said shearing type gage and a fixed resistor and applying a voltage obtained at an output end of said fixed resistor to an input end of said amplifier, and simultaneously by adding a voltage obtained from said drive voltage through a variable resistor to an output of said amplifier.

6. The converter of claim 1, comprising an impedance converting means connected between an output end of said shearing type gage and an input end of said amplifier.

7. The converter of claim 6, wherein said impedance converting means comprises means for adjusting amplification of said amplifier.

8. A semiconductor pressure converter comprising a shearing type gage formed at a strain generating part of a semiconductor diaphragm, said gate outputting a voltage in accordance with shearing stress generated at said strain generating part due to a measured pressure applied thereto; an ordinary type gage having the same impurity concentration as that of the shearing type gage and changing reversely the resistance value to said shearing type gage in response to said pressure applied to said semiconductor diaphragm; driving means for applying a drive voltage to a circuit comprising said ordinary type gage and said shearing type gage; and compensating means for compensating drive voltage applied to said shearing type gage depending on change of resistance corresponding to said applied pressure of said ordinary type gage so that non-linear error of output to said applied pressure of said shearing type gage is compensated.

9. The converter of claim 8, wherein said compensating means comprises an adjusting means for adjusting resistance value of said ordinary type gage.

10. The converter of claim 8, wherein said compensating means comprises means for applying said drive voltage to a series circuit comprising said shearing type gage and said ordinary type gage.

11. The converter of claim 8, wherein said compensating means comprises said ordinary type gage used as an input resistance of a non-inverting amplifier and means for applying a drive voltage obtained at an output thereof to said shearing type gage.

12. A semiconductor pressure converter comprising a shearing type gage formed at a strain generating part of a semiconductor diaphragm; a drive circuit for applying a drive voltage to a circuit comprising an ordinary type gage having the same impurity concentration as that of said shearing gage and changing pressure value in response to said applied pressure and said shearing type gage; amplifying means for amplifying an output voltage generated at an output end of said shearing type gage; and a temperature signal generating circuit for generating a temperature signal which becomes zero at a reference temperature in relation to difference between said reference temperature and ambient temperature so that temperature zero shift is compensated by controlling said amplifying means with said temperature signal and temperature span shift is also compensated by controlling said drive circuit.

13. The converter of claim 12, comprising means for applying to said temperature signal generating circuit voltage obtained by dividing predetermined DC voltage with a variable resistor and a temperature sensor.

14. The converter of claim 13, wherein said temperature sensor comprises means for utilizing the temperature characteristic between the base and emitter of a transistor.

15. The converter of claim 13, wherein said temperature sensor comprises means for utilizing the temperature characteristic of a thermistor.

16. The converter of claim 12, wherein said temperature signal generating circuit comprises means for obtaining a voltage by dividing predetermined DC voltage with a variable resistor; and comprises a temperature sensor comprises means for applying a temperature signal through a buffer amplifier.

17. A semiconductor pressure converter comprising a shearing type gage formed at a strain generating part of a semiconductor diaphragm, said gage outputting a voltage in accordance with a shearing stress generated at said strain generating part due to pressure being measured; a drive circuit for applying a drive voltage to a series circuit comprising an ordinary type gage having the same impurity concentration as that of said shearing type gage and changing resistance value in response to said applied pressure and said shearing type gage; an amplifying means for amplifying an output voltage from said shearing type gage; a zero adjusting means for applying a voltage related to said drive voltage to said amplifying means to adjust zero point; a span adjusting means for adjusting span by changing feedback voltage of said amplifying means; a temperature signal generating means for generating a temperature signal which becomes zero at a reference temperature in relation to difference between said reference temperature and ambient temperature; a temperature zero adjusting means for compensating for temperature zero shift by controlling said amplifying means with said temperature signal; and a temperature span adjusting means for compensating for temperature span shift by controlling said drive circuit with said temperature signal.

18. A semiconductor pressure converter comprising a line power supply generated by a part of current supplied from an external circuit through a receiving resistor and a 2-wire transmission system line; a shearing type gage formed at a strain generating part of a semiconductor diaphragm, said gate outputting a voltage in accordance with shearing stress generated at the strain generating part by pressure to be measured being applied thereto; a drive circuit for receiving power form said circuit power supply and for applying a drive voltage to a circuit comprising an ordinary type gage having the same impurity concentration as that of said shearing gage and changing resistance value in response to said applied pressure and said shearing type gage; amplifying means for receiving power from said circuit power supply and for amplifying an output voltage appearing at an output of said shearing type gage; zero adjusting means for adding a bias voltage in relation to the drive voltage of said drive circuit to said amplifying means and for adjusting zero point of said shearing type gage; span adjusting means for adjusting span by changing feedback voltage of said amplifying means; and current converting means for receiving power from said circuit power supply and for providing an output to said 2-wire transmission line after converting an output from said amplifying means to a current signal so that a current signal corresponding to said applied pressure to be measured is transmitted by adjusting said zero point and said span without mutual interference.

* * * * *